Dec. 10, 1968  R. G. FERRIS  3,415,455
FLAIL TYPE MATERIAL SPREADER
Filed Aug. 29, 1966  4 Sheets-Sheet 1

INVENTOR
ROBERT G. FERRIS
BY
Hofgren, Wegner, Allen,
Stellman & McCord
ATTYS.

Dec. 10, 1968    R. G. FERRIS    3,415,455
FLAIL TYPE MATERIAL SPREADER
Filed Aug. 29, 1966    4 Sheets-Sheet 2

Dec. 10, 1968  R. G. FERRIS  3,415,455
FLAIL TYPE MATERIAL SPREADER
Filed Aug. 29, 1966  4 Sheets-Sheet 3
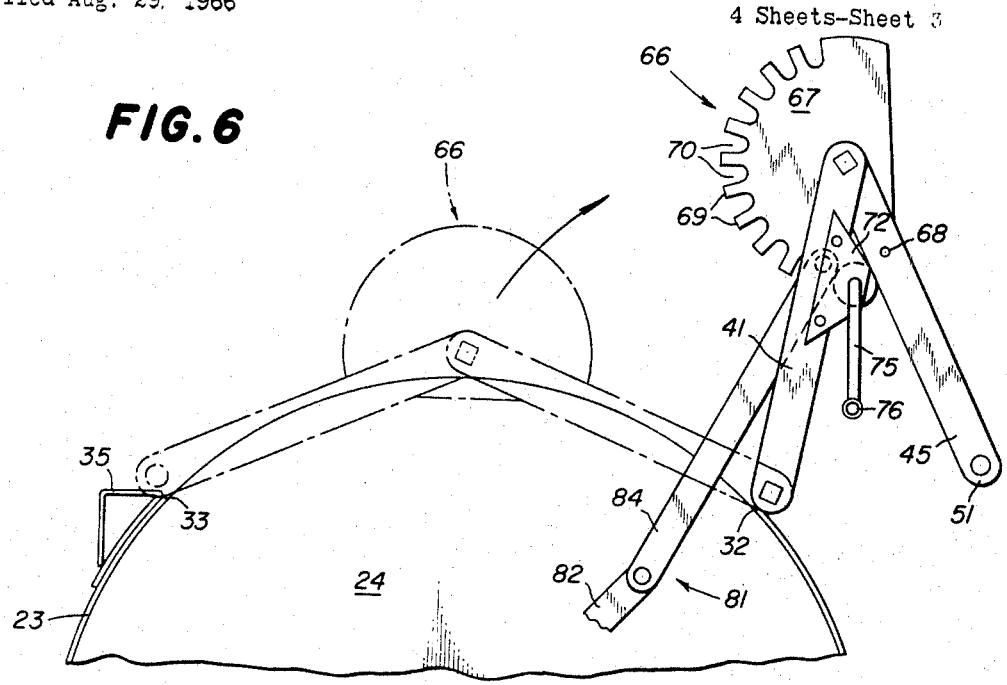
FIG. 6
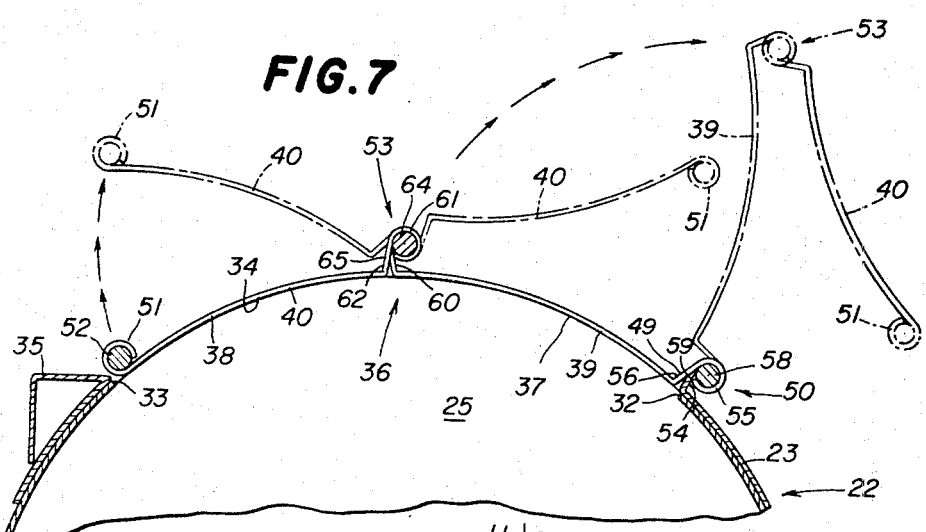
FIG. 7
FIG. 11
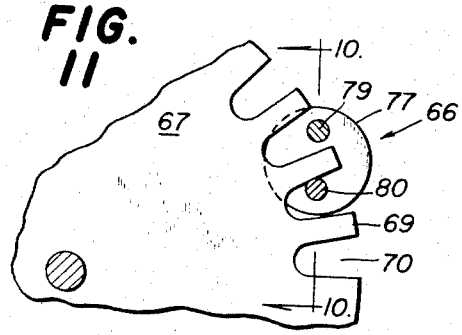
FIG. 10
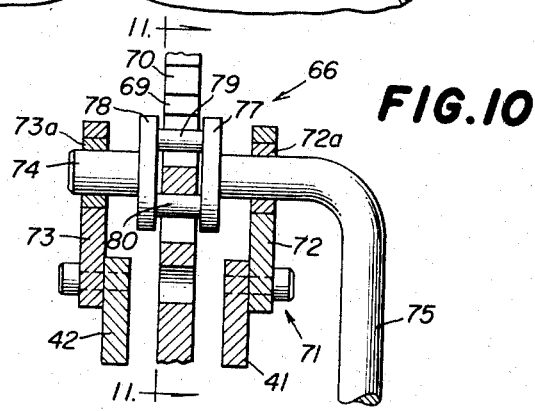

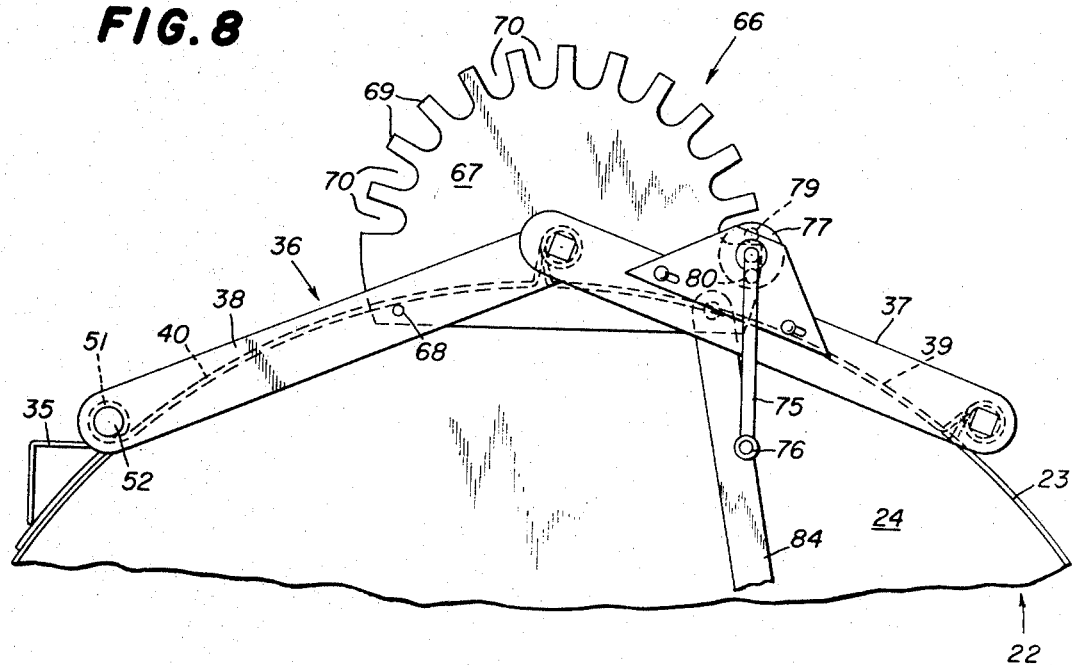
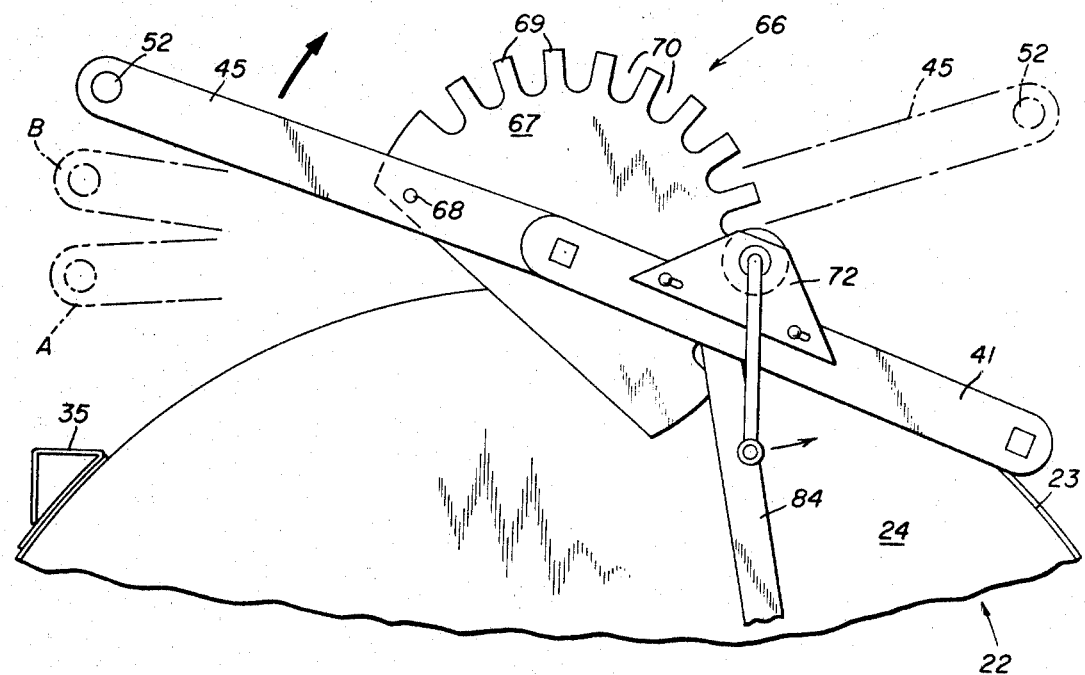

United States Patent Office 3,415,455
Patented Dec. 10, 1968

3,415,455
FLAIL TYPE MATERIAL SPREADER
Robert G. Ferris, Harvard, Ill., assignor to Starline, Inc., a corporation of Illinois
Filed Aug. 29, 1966, Ser. No. 575,850
6 Claims. (Cl. 239—658)

ABSTRACT OF THE DISCLOSURE

A flail type material spreader in which a cylindrical tank has its top margins not less than about three-fourths of the way from the bottom to the top of the circumference of the tank so as to provide a large capacity for solid, semi-solid or liquid material, and in which a combined closure and shield means includes a first portion hinged along a first tank margin, a second portion hinged to the first portion substantially on the vertical median plane of the tank and having a free edge adapted to close against the second tank margin, and in which means are provided for opening both portions for loading, or for opening the second portion only and fixing it in any desired position with respect to said second tank margin to provide a discharge opening that may be varied from a narrow slit to a wide opening.

---

The basic flail type spreader patent is Elwick 2,886,332, issued May 12, 1959. The basic Elwick spreader has a relatively limited capacity for handling material, because if solid material is pile dover the entire shaft, the flails are unable to break out and start throwing material. An improvement upon Patent 2,886,332 has "starter means," so that the shaft and chains may be completely buried in solid material (U.S. Patent 3,048,409, issued Aug. 7, 1962). Another type of "starter means" is disclosed and claimed in my copending application 487,728, filed Sept. 16, 1966.

Prior to this invention it was thought necessary to provide flail type spreaders with a discharge opening occupying about 90° of the circumference of the container. I have now discovered by careful observation of flail type spreaders in use that the flails discharge the material only in a relatively thin sheet close beneath the hinged hood which, in the flail type spreaders heretofore known, terminates substantially on the vertical median plane of the container. The present invention uses this hitherto unknown characteristic of flail type spreaders by moving the lower longitudinal margin of the discharge opening to a plane close to the top of the container, and thus greatly increases the capacity of the unit.

More and more materials are being spread in the form of slurrys which are basically liquid, and in order to permit the present unit to handle relatively large liquid loads the container is provided with a closure which substantially seals the discharge opening. Accordingly, the container may be filled with liquid to within a few inches of the margin of the discharge opening, and the closure may then be lowered against the discharge opening margin to permit the large liquid load to be moved to the field without slopping in the barnyard or on the highway.

The device of the present invention has an open top, the two margins of which are in the same horizontal plane more than three-fourths of the distance from the bottom to the top of the tank. A combined closure and shield means is made in two portions, with a first portion hingedly connected to the tank at a first margin of the opening, a second portion hinged to the free edge of the first portion, and the free edge of the second portion adapted to rest upon the tank body at the opposite margin of the opening. Means are provided for pivoting the second portion of the closure and shield means with respect to the first portion and retaining said second portion in any desired position between a fully closed and a fully open position. Means are also provided for pivoting the first portion so as to expose the entire opening for convenience in filling the tank with solid or semi-liquid material from a barn gutter cleaner or by means of a front end loader. If the tank is to be filled with liquid material that can be pumped through a hose, of course the second portion of the combined closure and shield means need be opened only enough to admit the hose.

The invention is illustrated in a preferred embodiment in the accompanying drawings in which:

FIG. 6 is a fragmentary front elevational view showing the combined closure and shield means in its fully opened position in full lines and in its closed position in dot-dash lines;

FIG. 7 is a fragmentary section on an enlarged scale taken substantially as illustrated along the line 7—7 of FIG. 1;

FIG. 8 is a front elevational view on an enlarged scale illustrating the combined closure and shield means in its fully closed position;

FIG. 9 is a fragmentary view similar to FIG. 8, but showing the closure and shield means in a partially open position suitable for discharge of material, with the second portion of said means also illustrated in dot-dash lines in two additional partially open positions and in its fully opened position;

FIG. 10 is a fragmentary section on an enlarged scale, of the operating means for the second portion of the closure and shield means as it appears when said portion is opened past the vertical median plane; and FIG. 11 is a fragmentary section taken substantially as illustrated along the line 11—11 of FIG. 10.

Figure 1:
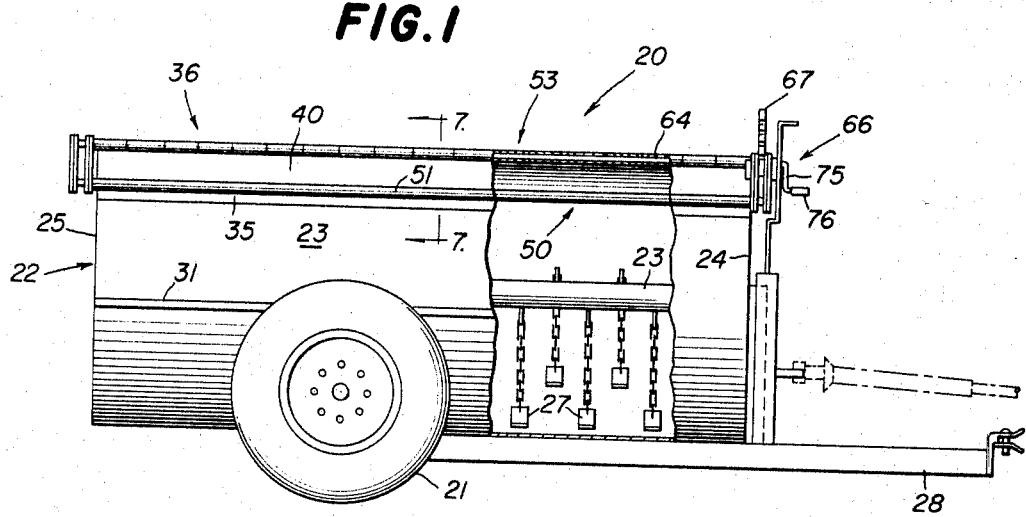
FIG. 1 is a side elevational view of a material spreader embodying the invention, with a portion of the tank broken away to illustrate the discharge shaft and chain flails.

Referring to the drawings in greater detail, and particularly to FIGS. 1 to 4, a spreader, indicated generally at 20, includes a wheeled carriage 21; a tank, indicated generally at 22, which has an effectively cylindrical longitudinal wall 23, a front wall 24 and a rear wall 25; a discharge shaft 26 journaled in the end walls on the axis of the cylinder; and chain flails 27 which are hung on the shaft 26 and are of such length that their tips traverse a path close to the cylindrical tank wall. A tongue 21a permits the spreader to be drawn behind a tractor, and a transmission system 28 at the front of the tank permits the shaft 23 to be driven from a tractor power take-off as in Elwick Patent 2,886,332. "Starter" flails in the form of pivoted arms 29 at the rear of the shaft have the structure disclosed and claimed in my copending application, previously identified.

Figure 4:
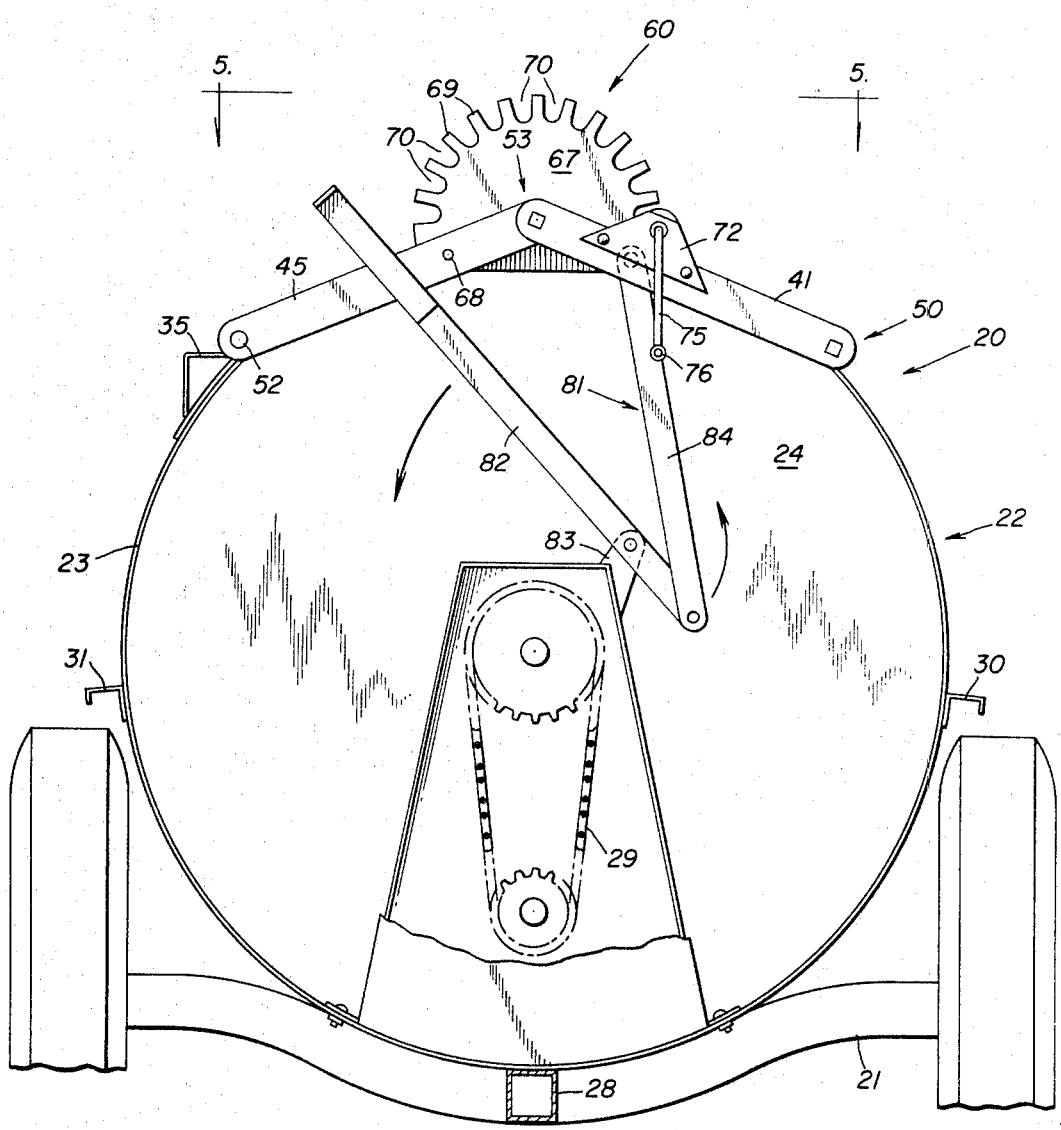
FIG. 4 is a front elevational view on an enlarged scale with parts of the drive casing and wheels broken away.

As best seen in FIGS. 1, 4 and 7, the tank 22 has a pair of reinforcing channels 30 and 31 extending from end-to-end, and has coplanar longitudinal margins 32 and 33 which define the longitudinal lower margins of a discharge opening 34. As seen by the arrows in FIG. 3, the chain flails 27, upon rotation of the shaft 26, turn in such a way as to throw material in the tank in the direction of the margin 33 of the opening 34, and as seen in FIGS. 4, 6, 7, 8 and 9, the margin 33 is reinforced by a triangular structural member 35. The margins 32 and 33 of the discharge opening occupy a transverse plane which is substantially more than three-quarters of the way from the bottom of the tank to its top, so that substantially the entire cubic capacity of the tank may be filled with material to be spread.

The term "effectively cylindrical" is applied to the tank wall 23 because the wall may deviate outwardly from a true cylinder in the area below the margin 33. Said margin serves as a "cutoff" edge when solid material is being spread, by shearing any clinging material from the tips of the flails; so it is preferred that the wall 23 be a true cylinder to locate the cutoff edge immediately adjacent the path of the flail tips. However, some outward deviation may be built into the wall and if a unit is to be used only with liquids that deviation may occur adjacent both of the longitudinal margins 32 and 33.

Figure 2:
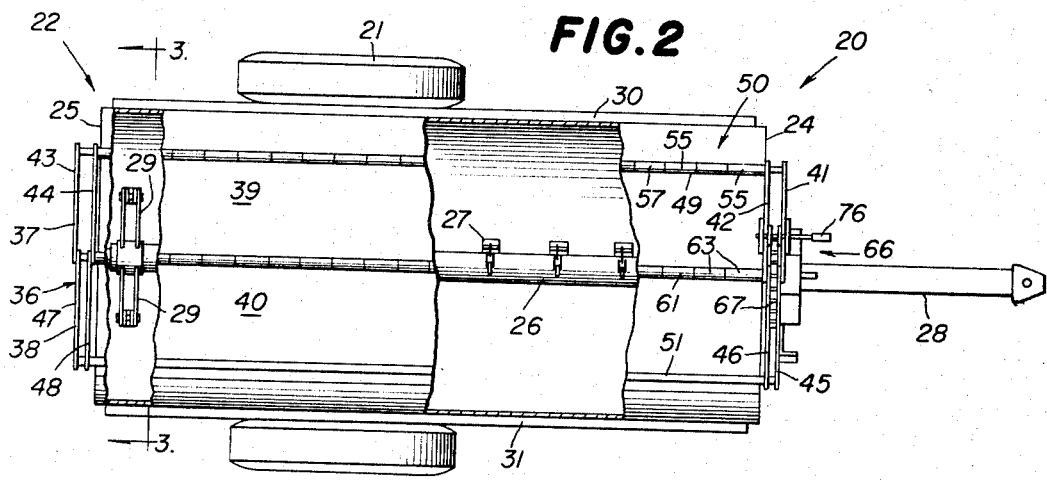
FIG. 2 is a plan view of the spreader with a portion of the tank and combined closure and shield means broken away to show the discharge shaft and chain flails.
Figure 3:
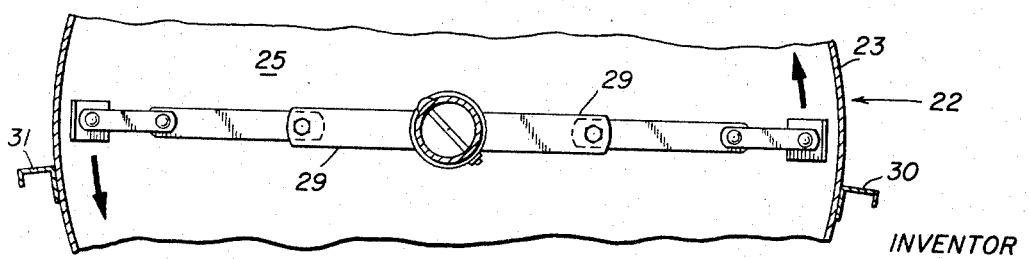
FIG. 3 is a fragmentary transverse section on an enlarged scale showing end "starter" flails in their extended positions.
Figure 5:
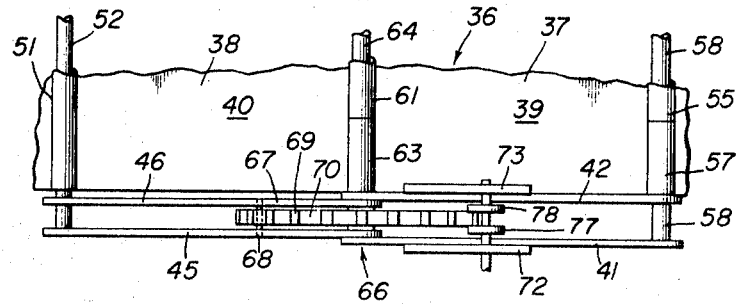
FIG. 5 is a fragmentary plan view taken substantially as illustrated along the line 5—5 of FIG. 4.

Referring again to FIG. 7, the spreader is provided with combined closure and shield means, indicated generally at 36, which includes a first closure and shield portion 37 and a second closure and shield portion 38 which consist principally of arcuate closure panels 39 and 40, respectively. As best seen in FIGS. 2, 4 and 5, the first portion 37 includes parallel outer and inner front arms 41 and 42, respectively, and parallel outer and inner rear arms 43 and 44; while the second portion 38 includes parallel outer and inner front arms 45 and 46 and parallel outer and inner rear arms 47 and 48. The closure and shield means 36 has a hinge edge 49 which is connected to the tank by hinge means, indicated generally at 50, and opposite the hinge edge 49 the closure means has a free edge 51 which is curled around a reinforcing rod 52. Further, the closure portion 37 extends from the hinge means 53 from the closed position of FIGS. 4 and 7 22 where the first portion 37 is provided with hinge means, indicated generally at 53, by which the second portion 38 is hingedly connected to said first portion 37. Thus, the second portion 38 may be swung about the hinge means 53 from the closed position of FIGS. 4 and 7 to a fully open position, and the first portion 37 may be swung about the hinge means 50 after the second portion 38 is fully opened so as to expose the entire filling and discharge opening 34.

Referring again to FIGS. 5 and 7, the first hinge means 50 includes an outturned marginal strip 54 along the edge 32 of the tank which is curled into a series of spaced hinge sleeves 55, and the hinge edge 49 of the closure and shield means 36 has an outturned marginal flange 56 which is rolled into spaced hinge sleeves 57 that alternate with the tank hinge sleeves 55, and a hinge pin 58 impales the alternating hinge sleeves 55 and 57 to form a piano type hinge. As seen in FIG. 7, when the closure and shield means 36 is in its fully closed position, the outturned strip 54 of the tank and the outturned flange 56 of the first portion 37 make a metal-to-metal contact along the line 59 which is positioned radially inwardly with respect to the hinge means so as to provide a liquid tight seal along the hinged edge of the cover. Similarly, the free edge of the closure and shield portion 37 has an outturned strip 60 which terminates in rolled, spaced hinge sleeves 61, while the second closure and shield portion 38 has an outturned flange 62 which terminates in rolled, spaced hinge sleeve 63, and a hinge pin 64 impales the alternating hinge sleeves 61 and 63 so as to provide a piano type hinge connecting the second closure portion 38 with the first closure portion 37; and the strip 60 and flange 62 make a metal-to-metal contact along the line 65 to provide a liquid tight seal when the closure and shield means is in its fully closed position.

The spreader also includes means, indicated generally at 66, by means of which the second closure and shield portion 38 may be swung about its hinge means 53 and held in any desired position between its fully closed position and its fully open position, as indicated by the broken line showings A and B and the full line showing of FIG. 9. Referring especially to FIGS. 8 to 11, the operating means 66 for said second portion 38 includes a sprocket sector 67 which is journalled upon the hinge pin 64 and has a stud 68 by means of which it is anchored to the outer and inner front arms 45 and 46 of the second portion 38. The sprocket sector 67 has a fluted periphery forming teeth 69 which are separated by the U-shaped recesses 70.

Carried upon the outer and inner front arms 41 and 42 of the first closure and shield portion 37 is a sprocket engaging drive assembly, indicated generally at 71. As best seen in FIG. 10, the drive assembly 71 includes triangular brackets 72 and 73 secured to the arms 41 and 42 and having bearings 72a and 73a respectively, in which a crank shaft 74 having a crank arm 75 and handle 76 is journalled. The crank shaft 74 includes parallel flanges 77 and 78 which flank the sprocket sector 67 and have connecting pins 79 and 80 which engage with the teeth 69, so that when the crank is rotated, the engagement of the pins 79 and 80 with the teeth 69 turns the sector 67 and the second closure and shield portion 38 to which it is connected about the hinge means 53. As seen in FIGS. 10 and 11, the pins 79 and 80 are in the same vertical plane with the crank handle 75 so that, as the crank assumes a stable position by reason of gravitational pull on the handle 75, the pins 79 and 80 occupy self-locking positions with respect to the sprocket sector 67, so that the sector maintains a fixed position regardless of the position of the second portion 38 with respect to the edge 33 of the discharge opening 34. The brackets 72 and 73 are secured to the arms 41 and 42 by means of bolts 72b which impale transverse slots 72c in the brackets, so the drive assembly 71 may be adjusted to place the pins 79 and 80 in proper relationship to the sprocket sector teeth.

Since the combined closure shield means 36 is relatively heavy, a simple manual link and lever system, indicated generally at 81 in FIGS. 4 and 6, includes a lever 82 which is pivoted on a bracket 83 and is connected by a link 84 with the first closure and shield portion 37 so that movement of the lever 82 in a clockwise direction, as indicated by the arrow in FIG. 4, causes the link 84 to swing said first portion 37 about the hinge means 50.

The two closure and shield portions cooperate to provide a material directing shield which, when the spreader is in use, cooperate with the margin 33 of the discharge opening to provide a narrow, elongated slot through which material may be discharged and which may be closed during transport.

When liquids are being spread it is advantageous to wrap all but a few flails onto the shaft and lash them so they cannot extend; and in fact excellent liquid spreading results are obtained by lashing all the chains and using only the pivoted starter flails 29 at the rear of the shaft to spread the liquid. When this is done the spreader, in effect, has only a pair of flails; and a single flail may be used by counterweighting the shaft opposite the single flail to minimize vibration. Use of only the end flails greatly reduces the hosepower required to operate the spreader.

Thus, insofar as liquid spreading is concerned, the spreader is much like a hammer-mill conveyor with an elongated housing; except that the chains wrap on the shaft and unwrap, rather than being substantially extended at all times.

It is clear from the foregoing detailed description that the present invention provides a spreader which is capable of handling extremely large loads, occupying practically its entire theoretical cubic capacity, and such loads may be of any consistency from a frozen beef pack through a semi-liquid to a thin liquid consistency. The extent to which the second closure and shield portion 38 is lifted off the discharge opening margin 33 depends in part upon the consistency of the material being spread.

It is apparent that any one of a number of means might be used for moving the second closure and shield portion 38 and retaining it in any desired adjusted position, including, for example, a suitable hydraulic cylinder and piston device. Similarly, hydraulic means might be substituted for the lever and link mechanism 81 for pivoting the entire closure and shield means 36 about the hinge 50.

The foregoing detailed description has been given for clearness of understanding only and no unnecessary limitations should be understood therefrom as modifications will be obvious to those skilled in the art.

I claim:
1. A flail type material spreader comprising, in combination:
   a wheeled carriage;
   a generally horizontally oriented tank on said carriage, said tank having end walls and an effectively cylindrical longitudinal wall that has first and second substantially parallel upper margins which are in a horizontal plane that intersects the vertical median plane of the tank no less than about three-fourths of the distance from the bottom to the top of the tank, so that the top of the tank has an opening from end to end;
   a combined material directing shield and closure means having a first longitudinal edge along the first upper tank margin, end edge portions adapted to rest on the end walls of the tank, and a free edge adapted to rest upon the longitudinal tank wall along said second upper tank margin, said shield and closure means including a first portion which includes said first longitudinal edge and which has an upper edge substantially on the vertical median plane of the tank, and said shield and closure means including also a second portion which extends from said upper edge to said free edge;
   first hinge means pivotally mounting said first edge on said first upper margin;
   second hinge means pivotally mounting said second portion on said upper edge for movement independent of said first portion;
   means for pivoting the closure and shield means about said first hinge means to uncover the entire open top portion of the tank;
   means for pivoting the second portion of the closure and shield means about said second hinge means;
   means for retaining said second portion with at least a part of said free edge a short distance above said second tank margin to provide a discharge slit between said free edge and said second margin;
   and rotatable flail means for discharging material through said slit, said flail means having a tip that may traverse a path close to the cylindrical tank wall.

2. The combination of claim 1 in which the second portion of the combined closure and shield means consists of a single piece, so that said retaining means retains said entire free edge a short distance above said second tank margin.

3. The combination of claim 1 which includes means engaging the second portion of the combined closure and shield means and operable to retain said portion in any position between a fully closed position and a fully open position.

4. The combination of claim 3 which includes a first member on the first portion of the combined closure and shield means, and a second member on the second portion of the combined closure and shield means, said members cooperating to move the second portion between its fully closed position and its fully open position and to retain said second portion in any desired position therebetween.

5. The combination of claim 4 in which the second member comprises a toothed segment secured to the second portion with its center on the pivot axis of the hinge for said second portion, and in which the first member comprises a crank journalled on the first portion and having pins engaging the segment so that rotation of the crank rotates the toothed segment.

6. The combination of claim 5 which includes means mounted on a container end wall for moving the first portion between a fully closed position and a fully open position.

References Cited

UNITED STATES PATENTS

| | | | |
|---|---|---|---|
| 2,199,134 | 4/1940 | Johnson | 160—213 |
| 2,774,506 | 12/1956 | Miller | 160—213 |
| 3,004,765 | 10/1961 | Wilkes | 239—658 |
| 3,174,757 | 3/1965 | Ferris | 239—658 |
| 3,211,461 | 12/1965 | Elwick | 239—662 |
| 3,258,270 | 6/1966 | Ferris | 239—658 |
| 3,294,406 | 12/1966 | Wood | 239—658 |

FOREIGN PATENTS 637,725  11/1936  Germany.

WALTER SOBIN, *Primary Examiner.*

U.S. Cl. X.R.

239—666, 670, 676; 222—544